(12) United States Patent
Van Santen

(10) Patent No.: US 11,582,901 B2
(45) Date of Patent: Feb. 21, 2023

(54) MOBILE FERTILIZER DEVICE FOR STORING AND SUPPLYING MULTIPLE FERTILIZERS TO A GREENHOUSE

(71) Applicant: YARA INTERNATIONAL ASA, Oslo (NO)

(72) Inventor: Wouter Van Santen, Kortgene (NL)

(73) Assignee: YARA INTERNATIONAL ASA, Oslo (NO)

( * ) Notice: Subject to any disclaimer, the term of this patent is extended or adjusted under 35 U.S.C. 154(b) by 611 days.

(21) Appl. No.: 16/613,330

(22) PCT Filed: Jul. 18, 2018

(86) PCT No.: PCT/EP2018/069529
§ 371 (c)(1),
(2) Date: Nov. 13, 2019

(87) PCT Pub. No.: WO2019/016277
PCT Pub. Date: Jan. 24, 2019

(65) Prior Publication Data
US 2020/0146210 A1    May 14, 2020

(30) Foreign Application Priority Data

Jul. 18, 2017  (EP) .................................... 17181955

(51) Int. Cl.
*A01C 23/00* (2006.01)
*A01C 15/00* (2006.01)
(Continued)

(52) U.S. Cl.
CPC .......... *A01C 23/008* (2013.01); *A01C 15/003* (2013.01); *A01C 23/007* (2013.01); *A01G 9/14* (2013.01); *B65D 88/121* (2013.01)

(58) Field of Classification Search
CPC ... A01C 23/008; A01C 15/003; A01C 23/007; A01C 23/00; A01C 15/00; A01G 9/14;
(Continued)

(56) References Cited

U.S. PATENT DOCUMENTS 4,109,677 A   8/1978 Burnside
5,502,685 A   3/1996 Orlando

FOREIGN PATENT DOCUMENTS

DE    102004059291 A1    6/2006

OTHER PUBLICATIONS

Yara, Substrafeed—maximale flexibiliteit en gemak, https://web.archive.org/web/20170424235248/http://www.yara.nl/, 2017.
(Continued)

*Primary Examiner* — Christopher J. Novosad
(74) *Attorney, Agent, or Firm* — Dilworth IP, LLC

(57) ABSTRACT

A mobile device for storing and supplying multiple liquid fertilizers, comprising a housing, enclosing: two or more storage units, each suitable for storing a liquid fertilizer, wherein each storage unit is provided with a storage unit level measurement system, a storage unit filling system and a storage unit venting system; a safety drain liquid fertilizer storage, comprising at least two separate collectors for the separate containment of spilled liquid fertilizer; a dosing and controlling system; and wherein the housing is equipped with a connection for the input of a water flow, at least two connections for the output of liquid fertilizer, and an output for venting gasses.

19 Claims, 3 Drawing Sheets

(51) Int. Cl.
*A01G 9/14* (2006.01)
*B65D 88/12* (2006.01)

(58) Field of Classification Search
CPC ........ A01G 9/00; B65D 88/121; B65D 88/12; B65D 88/02; B65D 88/00
See application file for complete search history.

(56) References Cited

OTHER PUBLICATIONS

Notification of Transmittal of the International Search Report and the Written Opinion of the International Searching Authority, or the Declaration issued in PCT/EP2018/069529 dated Oct. 4, 2018.
Notification of Transmittal of the International Preliminary Report on Patentability issued in PCT/EP2018/069529 dated Jul. 3, 2019.

MOBILE FERTILIZER DEVICE FOR STORING AND SUPPLYING MULTIPLE FERTILIZERS TO A GREENHOUSE

FIELD OF THE INVENTION

The present invention relates to a mobile device comprising a housing, enclosing: two or more storage units, each suitable for storing a liquid fertilizer, wherein each storage unit is provided with a storage unit level measurement system, a storage unit filling system and a storage unit venting system; a safety drain liquid fertilizer storage comprising at least two separate collectors for the separate containment of spilled liquid fertilizer; a dosing and controlling system; and wherein the housing is equipped with a connection for the input of a water flow, at least two connections for the output of liquid fertilizer, and an output for venting gasses, wherein the mobile device is suitable for the storage and supply of multiple liquid fertilizers.

In particular is the invention concerned with a method for storing and providing multiple liquid fertilizers to a greenhouse, in particular to the fertigation system of a greenhouse, using the above described mobile device.

BACKGROUND OF THE INVENTION

Greenhouses, such as the ones using hydroponics, or substrate-based culture, are generally provided with systems to supply one or more liquid fertilizers to the crops, grown in said greenhouse. These systems can be relatively simple, but may also be part of a more complex fertigation system, including one or more sensors which measure the total water and/or nutrient consumption by the crop, the temperature in the greenhouse, and various other parameters.

One of such prior art supply systems on the market is the YaraTera SUBSTRAFEED™ system, offered by Yara (Yara International ASA, Norway) to high-technology greenhouses in North West Europe. This system is globally the most sophisticated Yara Crop solution offer to growers. It provides seven different fertilizer compositions and is perfectly balanced in maximum concentration (=efficiency) and safety (maximum 6H+ mole/kg). It is a solution which allow growers at any time to dose exactly the amount of nutrients needed by the crops with a re-circulation of unused fertilizer, and hence without the loss of nutrients at all. The system is supported by YaraTera Fertigation software.

Due to the complexity and the cost of installation, only new greenhouses consider investing in this technology. For example, a manual SUBSTRAFEED™ installation for 5 ha of tomato costs about 33.000 Euro. To experience all benefits of SUBSTRAFEED™ (a fully automatic version), another 35.000 Euro investment is needed. The SUBSTRAFEED™ installation in usually installed inside the greenhouse and is directly coupled to the fertigation system thereof, in particular to the storage and nutrient tanks thereof. It consists of two or more storage units suitable for storing a liquid fertilizer, a safety drain liquid fertilizer storage, a storage unit level measurement system, a storage unit filling and venting system, and a dosing and controlling system including one or more pumps, and is connected to the storage and mixing tanks of the fertigation system. It does not comprise a separate housing, nor are pipes, tubing, etc. arranged in a compact configuration.

In order to open up the market for existing greenhouses and smaller greenhouses, a new technology is needed, based on a "turn-key" set up which make installation easier and the costs lower.

PRIOR ART

U.S. Pat. No. 5,502,685 (Orlando, 1996) discloses a chemical mixing device for mixing water and a chemical into a first and second mixing tank. The disclosed device lacks at least the safety drain liquid fertilizer storage, comprising at least two separate collectors, and a storage unit venting system according to the invention. Furthermore, the housing lacks at least two connections for the output of liquid fertilizer, and an output for venting gasses.

U.S. Pat. No. 4,109,677 (Burnside, 1978) discloses a device for preventing unintentional removal of the contents of mobile tanks before unlocking the vent caps thereof.

DE 10 2004 059 291 A1 (Ballan Öko-Technik, 2006) discloses a device for dosing manure or any other liquid fertilizer onto an agricultural field.

SUMMARY OF THE INVENTION

The inventors have now realized that a part of the system, i.e. the part which comprises the storage and supply of multiple liquid fertilizers may be designed as a "stand-alone" unit, which is mobile and can be offered on a need-to-have basis to growers that have a fertigation system installed in their greenhouse. Such a system may be offered to growers only during the growing season of particular crops, such as tomatoes, flowers, cucumbers, and the like, or on a trial basis before switching over to a permanent choice for a storage and supply system for liquid fertilizers.

According to one embodiment, the mobile device for supplying multiple liquid fertilizers to a greenhouse, comprises a housing, enclosing: two or more storage units, each suitable for storing a liquid fertilizer, wherein each storage unit is provided with a storage unit level measurement system, a storage unit filling system and a storage unit venting system; a safety drain liquid fertilizer storage, comprising at least two separate collectors for the separate containment of spilled liquid fertilizer; a dosing and controlling system; and wherein the housing is equipped with a connection for the input of a water flow, at least two connections for the output of liquid fertilizer, and an output for venting gasses.

With "liquid fertilizer" according to the invention is meant an aqueous solution of one or more ions, such as calcium, potassium, magnesium, trace elements, ammonium, nitrate, sulphate, phosphate, and the like, either acidic, alkaline, or neutral in nature. Preferably, the liquid fertilizer is a concentrated aqueous solution of one or more ions, such as more than 1 mol/kg, or 1% (w/w). Plain water is not regarded as a liquid fertilizer within the meaning of this disclosure.

According to one embodiment, the housing is provided with a rigid base, suitable for supporting the further parts of the device, a top, and at least three sides, all of them fixed between the base and the top, thus forming a box, open at one side, such as a freight container. The housing is preferably made of a material that is weather-resistant and waterproof, such as canvas, steel, glass or plastics, and is preferably rigid, although a housing comprising a frame on top of a rigid base, at least partly covered with a tarpaulin is also feasible. Preferably, at one side, the housing is provided with a side that can be opened and closed off with a door or the like, and that provides an opening to the housing. This allows for maintenance of the housing and the parts of the device that are enclosed by said housing, the filling of the storage units, etc. Advantageously, when the top and sides are made of a rigid material, such as steel, the necessary piping and tubing can be affixed to said rigid top and sides, thus providing a compact and robust setup. Preferably, the top, sides and base are made at least mainly of steel.

Within the meaning of this description, "mobile" means that the device can easily be moved as a whole from one location to another location either by towing, or by affixing the device to a truck, and it is arranged as a "plug-and-play" device: it can easily be connected to the greenhouse fertigation system and a power line. The device can be affixed to a moving means, such as a wheel base, or provided with wheels, tracks, slides and the like. The device can be provided with motorized means, or can be connected to a motorized means, such as a truck. According to one embodiment, the device is a truck, a trailer, or a semi-trailer, carrying the housing and its interior parts. According to another embodiment, the device is a container that can be affixed to a truck. According to one embodiment, the device is a freight container, in particular a 10 feet, 20 feet or 40 feet freight container.

According to one embodiment, the storage units each suitable for storing a liquid fertilizer are plastic vessels, such as made of polyethylene. Preferably, the storage units have a circular, preferably horizontal, cross section. According to one embodiment, the at least one storage unit is adapted to hold at least 0.1 $m^3$ and at most about 10 $m^3$ of liquid fertilizer, in particular at least about 1 $m^3$ and at most about 5 $m^3$ of liquid fertilizer. Preferably, the storage units are made of white transparent polyethylene, such that the level of liquid in the tank can be inspected visually. According to one embodiment, the mobile device comprises two storage units, each suitable for containing a different liquid fertilizer, of which one is acid-based and the other is alkaline-based. According to one embodiment, the mobile device comprises seven storage units, each suitable for containing a liquid fertilizer. According to one embodiment, the mobile device comprises seven storage units, each suitable for containing a different liquid fertilizer of which at least one is acid-based and at least one is alkaline-based. According to a preferred embodiment, all of the storage units in a mobile device contain a liquid fertilizer.

According to the invention, the mobile device comprises a safety drain liquid fertilizer storage comprising two separate collectors for the separate containment of spilled liquid fertilizer. This specific safety drain is necessary to contain and separate the acid and alkaline liquids in the event the storage units or the piping thereof would leak, rupture, break or spill its liquid in any other way since the spilled liquid fertilizer, especially in concentrated form, is likely to corrode or damage the housing, endangering the functionality of the mobile device according to the invention. Optionally, such safety drain liquid fertilizer storage may be equipped with one or more sensors for detection of spilled liquid fertilizer, coupled to a corresponding alarm system.

According to the invention, each storage unit of the mobile device comprises a storage unit level measurement system. Although the level can be inspected visually, it is good practice to have a level measurement system installed in each unit, either analogue or digital, to assist in detecting the level of liquid in the unit, suitable for warning if the level reached a critically low level, or for use in the refilling of such a storage unit by the supplier of the liquid. For example, it is preferred to use an electrical pressure sensor (at the bottom of the unit).

In an advanced embodiment of the invention, the storage units and/or the mobile device may optionally be equipped with a telemetric system that monitors the level of the storage units, and sends a (wireless) signal to the provider of the liquid fertilizer and/or the grower to inform him of the level status of each unit, and to request (re)filling of the one or more storage units.

According to the invention, each storage unit of the mobile device comprises a storage unit filling and venting system. For (re)filling of the storage units, a filling and venting system is provided in which each storage unit is provided with its own filling line, through which liquid fertilizer is transferred into the unit, preferably by pumping. The venting system may be designed such that each storage unit is provided with its own venting pipe exiting outside the housing, or that several storage units are connected to a common venting pipe existing outside the housing. The venting pipes end outside of the housing and may vent the venting gasses into the ambient air, or be connected to venting pipes from the greenhouse. The material of the filling and venting lines, including the valves and sealing, should be such that it is resistant to the respective fertilizer liquids in the storage units they are connected to. For example, EPDM can be used for valves as it has a fair chemical resistance, especially to alkalines, oxidizing chemicals, and medium concentration acids. Alternatively, Viton (fluorocarbon) can be used when a high resistance against acids is required. The filling ports may either be located inside the housing, or may be located outside the housing, such that the storage units in the container may be filled up from the outside of the container. The venting system according to the invention is essential as it prevents the accumulation and subsequent reaction of the venting gasses within the housing of the mobile container, endangering the functionality of the mobile device according to the invention.

According to one embodiment, the mobile device comprises a dosing and controlling system. To dose liquid fertilizer from the storage units to e.g. a fertigation system of a greenhouse, the mobile device comprises a dosing and controlling system. According to one embodiment, this system comprises one or more pumps, suitable to transport the liquid fertilizer, the necessary valves and the necessary hard- and software to controllably transfer liquid fertilizer from each storage unit to the fertigation system. The software may manage the transfer of one liquid, or may manage a complete recipe, wherein one or more liquids is sequentially withdrawn from its storage unit and transferred to an A or B nutrient tank of the fertigation system using one or more pipes, intermitted by a flow of water to purge and clean the pipes.

According to the invention, the housing is equipped with a connection for the input of a water flow, preferably at the outside of the mobile device. The water is necessary for purging and cleaning the pipes between different liquid fertilizer flows through said pipes, in particular an acid and a base type of liquid fertilizer solution.

According to the invention, the housing is equipped with at least two connections for the output of liquid fertilizer, in particular for the output of two different and separate flows of liquid fertilizer. The mobile device for supplying liquid fertilizers is designed to be connected to the greenhouse fertigation system through piping that can be connected to the classical two-tank nutrient system to make the nutrient stock solutions A and B. The two nutrient tanks will be called Tank A and Tank B. The designation of A and B is universal and for a very good purpose, that is to prevent any confusion as to what is in each nutrient tank as the mixing of different nutrients need to be done such that no precipitation occurs. The golden rule is that all nitrogen, potassium, phosphorus, magnesium and micro nutrients, except iron, are added to Tank A and that all calcium and iron fertilizers are added to Tank B.

According to one embodiment, two A connections and two B connections are provided for maximum flexibility in preparing the 2 sets of stock solutions A and B, that end outside of the mobile device.

Furthermore, the mobile device is optionally equipped with connections for connection to an external electrical power system, and is provided with the necessary pipes for filling and venting of the storage units. Optionally, the device may be provided with an independent power source, such as a battery, battery pack, solar cells, diesel power generator and the like.

According to a further embodiment, one or more additional connections can be provided to externally located storage units containing liquid fertilizer. These connections (pipes) are then integrated into the dosing system for combination with the storage units located inside the mobile device, and controlled by the same dosing system as the storage units inside the housing.

According to a further aspect of the invention, a method is provided for storing and supplying multiple liquid fertilizers using the mobile device as described above, in particular wherein the mobile device comprising a housing, enclosing:

two or more storage units, each suitable for storing a liquid fertilizer, wherein each storage unit is provided with a storage unit level measurement system, a storage unit filling system and a storage unit venting system;

a safety drain liquid fertilizer storage, comprising at least two separate collectors for the separate containment of spilled liquid fertilizer;

a dosing and controlling system; and wherein the housing is equipped with a connection for the input of a water flow, at least two connections for the output of liquid fertilizer, and an output for venting gasses.

In particular, the method is provided for storing and supplying multiple liquid fertilizers using the mobile device as described above to a greenhouse, in particular, to the fertigation system thereof.

According to one embodiment, the mobile device is delivered at a greenhouse, where it is parked either inside or outside thereof and connected to a water supply (input) and the A and/or B-tanks of the fertigation system (output). Optionally, it may also be connected to a venting system of the greenhouse, as well as to an external electrical power system. When the storage units are filled up with liquid fertilizer, the system is ready to go, and may produce any flow or mixture of liquid fertilizer, depending on the content of the storage units and the recipes of the dosing system.

BRIEF DESCRIPTION OF THE DRAWINGS

The invention will now be elucidated on the basis of one embodiment, as depicted in FIG. 1 and described hereafter. However, the invention will not be limited thereto but only by the scope of the claims as appended.

One embodiment for carrying out the invention is illustrated in the accompanying drawing in which FIG. 1 provides a perspective view of a layout of a device according to the invention.

DETAILED DESCRIPTION OF THE ILLUSTRATED EMBODIMENT

Figure 1:
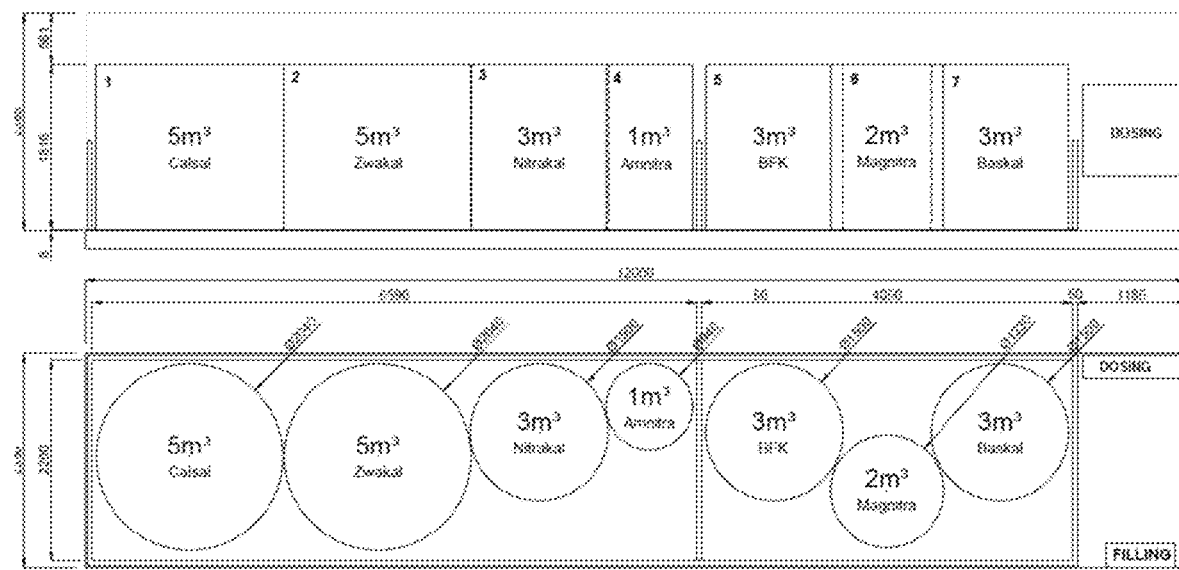

Referring to FIG. 1, a layout is shown of a mobile device in accordance with the present invention, generally designed for introducing liquid fertilizers into fertigation or hydroponic systems for fertigation applications.

The device comprises 7 vessels, ranging in content between 5 and 1 $m^3$. The vessels are designed to hold different liquid fertilizer and are positioned in a safety drain liquid fertilizer storage comprising two separate collectors. According to the SUBSTRAFEED™ system, the vessels can hold volumes of the following liquid fertilizers (names are tradenames of Yara):

| Vessel | Name | Composition |
|---|---|---|
| 1 | CALSAL ™ | Calcium nitrate solution; 8.7% (w/w) Total N 8.7% (w/w) Nitrate N; 0.002% Ammoniacal N (very low); 12.5% (w/w) Calcium Ca (17.5% (w/w) CaO); density at 20° C. 1.5 kg/l |
| 2 | ZWAKAL ™ | 0.6 mole K/kg; 1.2 mole Mg/kg; 3.0 mole S/kg; 3 mole H+/kg; density at 20° C. 1.32 kg/l. |
| 3 | NITRAKAL ™ | Nitric acid solution; 7 mole N—$NO_3$/kg; 1 mole K/kg; 6 mole H+/kg; density at 20° C. 1.32 kg/l. |
| 4 | AMNITRA ™ | Ammonium nitrate solution; 6.43 mole N—$NH_4$/kg; 6.43 mole N—$NO_3$/kg; density at 20° C. 1.24 kg/l. pH neutral. |
| 5 | BFK ™ | 2.31 mole P/kg; 5.31 mole K/kg; 3.0 mole OH−/kg; density at 20° C. 1.47 kg/l. |
| 6 | Magnitra ™ | Magnesium nitrate solution; 2.5 mole Mg/kg; 5.0 mole N—$NO_3$/kg; density at 20° C. 1.35 kg/l; pH neutral. |
| 7 | BASKAL ™ | Solution of potassium carbonate and potassium hydroxide; 7.0 mole K/kg; 7.0 mole OH− kg; density at 20° C. 1.45 kg/l. |

Near the access opening in one side of the container, filling and outlet valves are provided for filling the storage units and for extracting the liquid fertilizer from the storage units in a controlled way.

Figure 2:
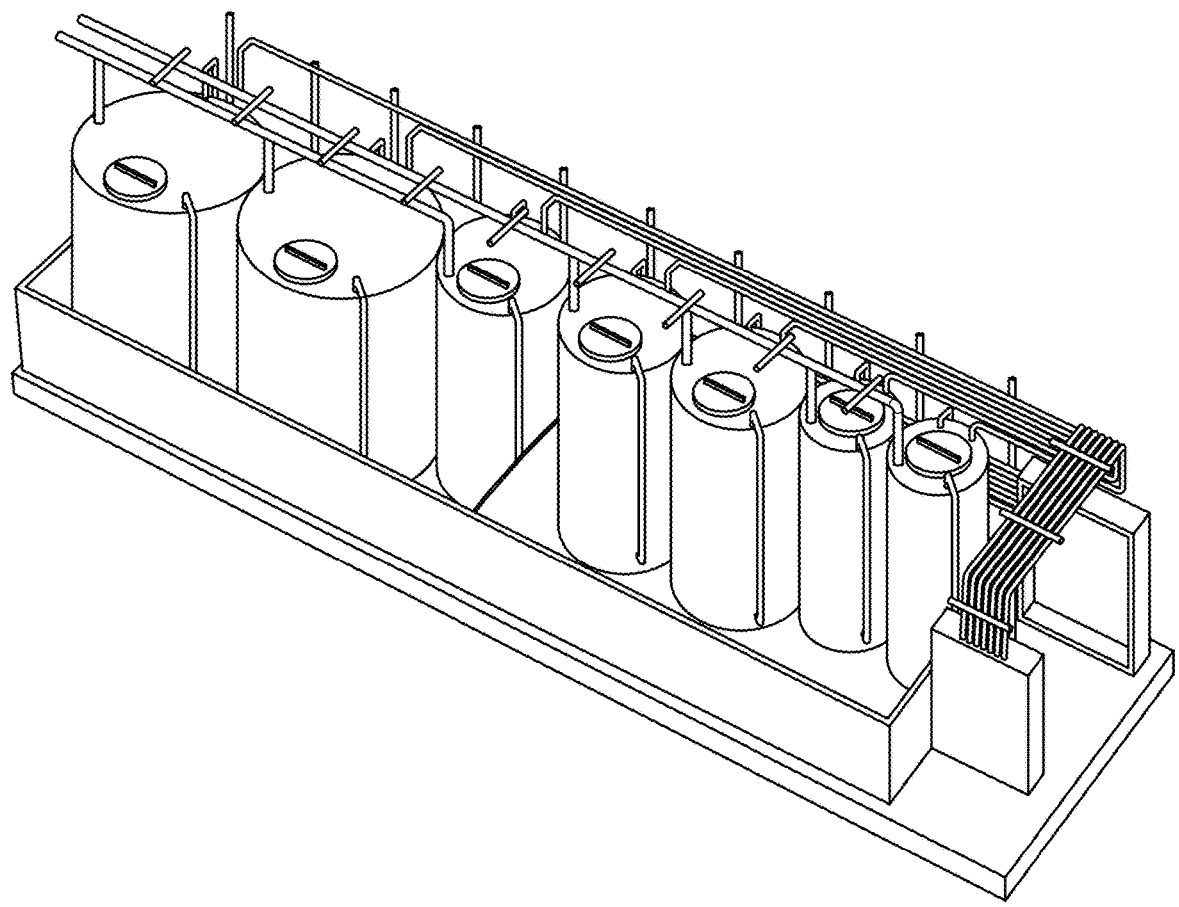
FIG. 2 provides a 3D-view of the inside of a container wherein each storage unit is provided with a venting pipe, which is provided on top of the unit, and is connected to one or more common venting pipes.

Referring to FIG. 2, a 3D-view is shown of an embodiment of the inside of a container according to the invention. Each storage unit is provided with a venting pipe, which is provided on top of the unit, and is connected to one or more common venting pipes. Storage unit 1 and 2 are connected to one common venting pipe, and storage units 2 to 6 are equally connected to one common different venting pipe. Both pipes vent to the exterior of the container. Liquid fertilizer is filled into the storage units by a set of pipes, connecting to the top of each unit. Liquid fertilizer is extracted from the storage units by a set of pipes, connecting to the base of each unit.

Figure 3:
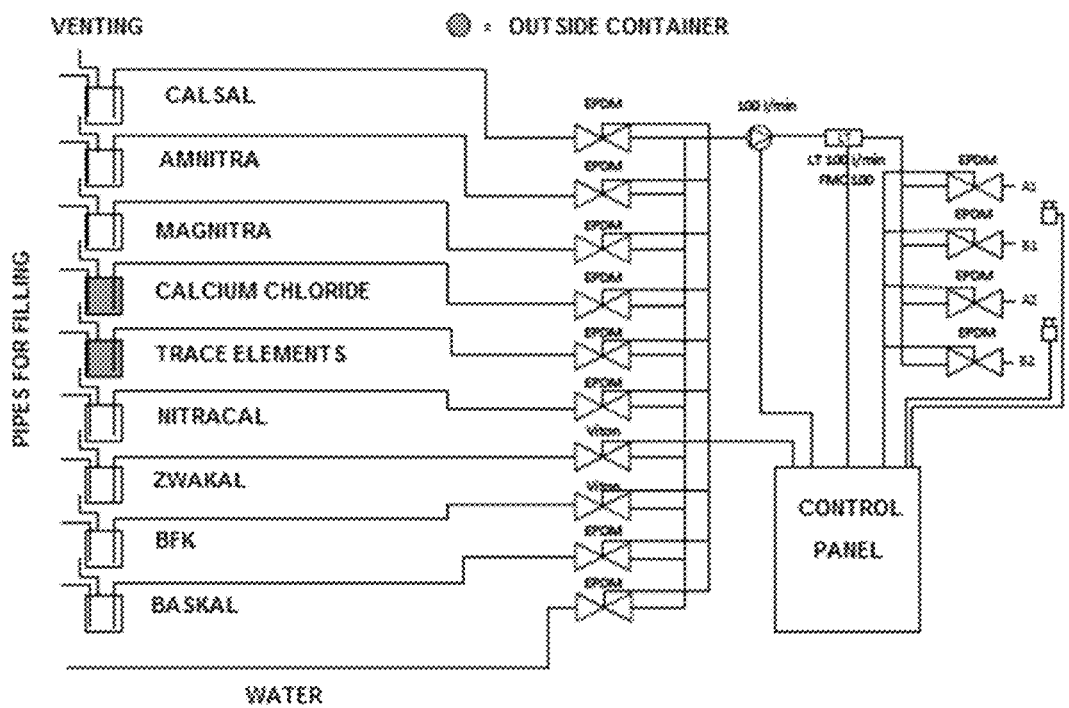
FIG. 3 provides a plot plan of the connection of the 7 storage units inside the mobile device and 2 storage units outside the mobile device.

Referring to FIG. 3, a principle schema is shown for connection of the 7 storage units inside the mobile device and 2 storage units outside the mobile device. Each storage unit is connected through a valve (EPDM or Viton) to a set of 4 output lines (A1, A2, B1 and B2). Each valve is controlled by a controller (control panel) that can dose appropriate amounts of liquid fertilizer from each of the 9 storage units, intermitted by a flow of water.

Figure 4:
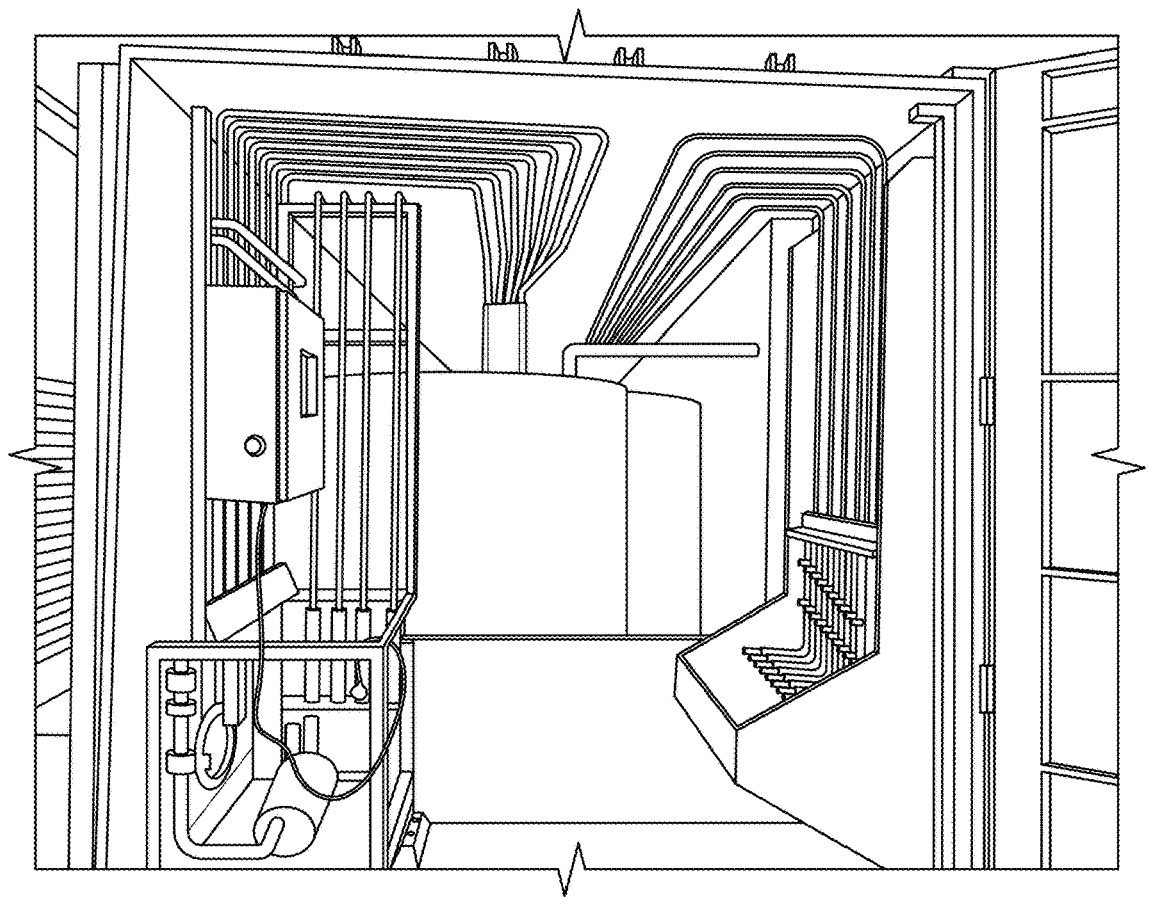
FIG. 4 provides a view of the access opening of a container, and shows filling points for the storage units, the dosing system including the control panel, and a pump fixed onto the base of the container.

Referring to FIG. 4, the access opening of the container is shown, showing, to the right, the filling points for the storage units, and to the left, the dosing system including the control panel, and a pump fixed onto the base of the container.

Figure 5:
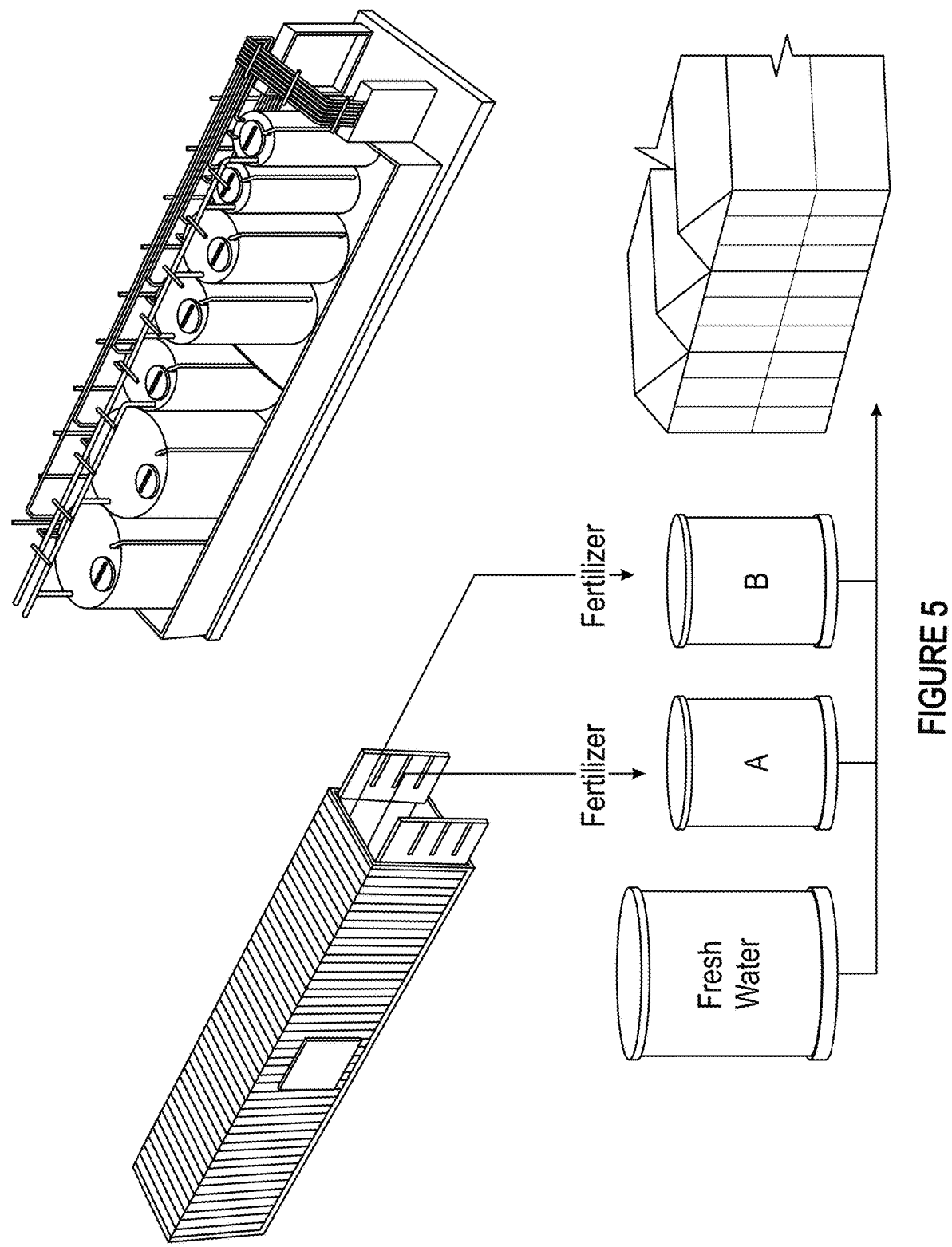
FIG. 5 provides a 3D-view of the connection of the mobile device to a greenhouse fertigation system comprising two nutrient tanks A and B.

Referring to FIG. 5, the connection of the mobile device according to the invention to a greenhouse fertigation system comprising two nutrient tanks A and B is shown.

The invention claimed is:

1. A mobile "plug-and-play" device for storing and supplying multiple liquid fertilizers, comprising a housing, enclosing
   two or more storage units, each for storing a different liquid fertilizer of which at least one is acid-based and at least one is alkaline-based, wherein each storage unit is provided with a storage unit level measurement system, a storage unit filling system and a storage unit venting system;
   a safety drain liquid fertilizer storage, comprising at least two separate collectors for the separate containment of spilled liquid fertilizer, to contain and separate spilled acid-based and alkaline-based liquid fertilizers; and
   a dosing and controlling system,
wherein the housing is equipped with a connection for the input of a water flow, at least two connections for the output of two different and separate flows of liquid fertilizer, designed to be connected to a fertigation system that uses a two-tank nutrient system, and an output for venting gasses.

2. The device according to claim 1, wherein the device is a freight container, a truck, a trailer, or a semi-trailer.

3. The device according to claim 2, wherein the device is a freight container.

4. The device according to claim 3, wherein the freight container has a dimension of from 10 to 40 feet.

5. The device according to claim 1, wherein the housing is a rigid housing.

6. The device according to claim 5, further comprising piping and tubing affixed to the rigid housing.

7. The device according to claim 5 wherein the housing is made of metal.

8. The device according to claim 1, wherein at least one storage unit is adapted to hold at least 0.1 $m^3$ and at most 10 $m^3$ of liquid fertilizer.

9. The device according to claim 8, wherein at least one storage unit is adapted to hold at least about 1 $m^3$ and at most 5 $m^3$ of liquid fertilizer.

10. The device according to claim 1, wherein all storage units in the mobile device contain a liquid fertilizer.

11. The device according to claim 1, wherein the mobile device comprises seven storage units.

12. The device according to claim 11, wherein each of the seven storage units contain a different liquid fertilizer of which at least one is acid-based and at least one is alkaline-based.

13. The device according to claim 1, wherein the level measurement system comprises an electrical pressure sensor.

14. The device according to claim 1, further comprising at least one additional connection to externally located storage units containing liquid fertilizer.

15. A method comprising supplying multiple liquid fertilizers to a fertigation system of a greenhouse that uses a two-tank nutrient system comprising Tank A and Tank B with the mobile device of claim 1.

16. The method according to claim 15 further comprising making a fertilizer solution in at least one of Tank A and Tank B from an output flow comprising multiple liquid fertilizers of the mobile device.

17. The method according to claim 16 wherein the fertilizer solution in Tank A is prepared from at least one first output flow comprising a liquid fertilizer of the mobile device, and the fertilizer solution in Tank B is prepared from at least one second output flow comprising a liquid fertilizer of the mobile device.

18. A process comprising transferring liquid fertilizer from the mobile device of claim 1 to a fertigation system.

19. The process of claim 18, wherein the mobile device is connected to a water supply, at least one of an A-nutrient tank and a B-nutrient tank of the fertigation system of a greenhouse, and, optionally, to at least one of a venting system of a greenhouse and an external electrical power system.

* * * * *